though the annular gap bounded by the cylinder and the abutment disc is interrupted by the arms supporting the abutment disc, this only slightly reduces the section of free passage. The arms spread over the length of the annular gap may even exert a conveying action on the cooling air. The heat insulating linings provided according to the invention between the supporting arms of the cylinder and the abutment disc attached to them prevent any harmful heating of the cylinder. Moreover it has been found that with the construction according to the invention the pressure disc provided with surface-enlarging and air-conveying blades and axial passages is heated only relatively slightly during normal use, so that no heat insulating lining need be provided between the piston and the pressure disc.

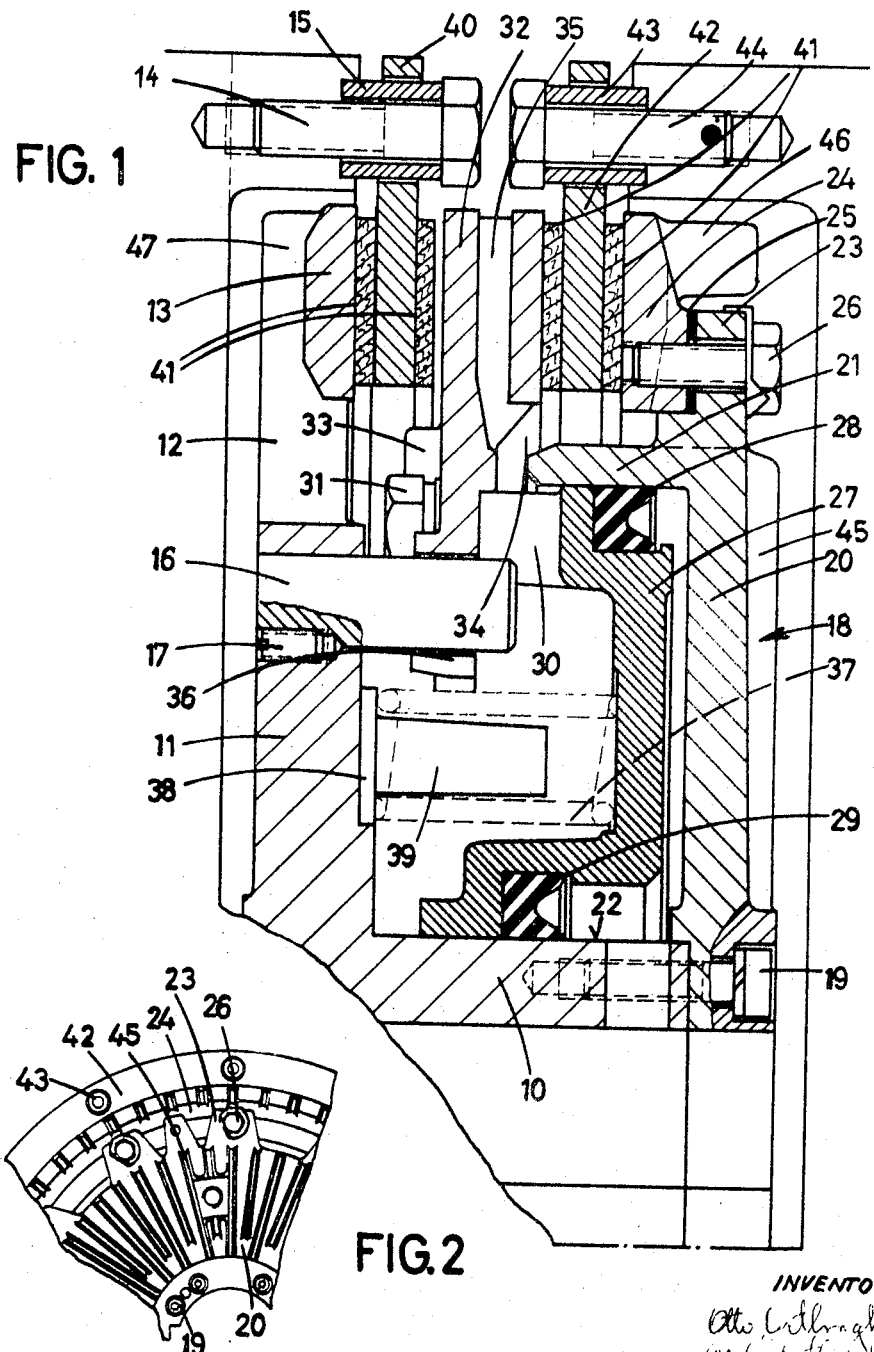

In order to avoid unfavourable stresses and accumulation of material it is advisable, according to a further feature of the invention, for the members of the brake means and of the coupling means which cooperate with the pressure disc and abutment discs to be in the form of identical circular discs with apertures distributed over the periphery, the apertures being adapted to be slid onto the shanks of shank screws or on to sleeves surrounding the shanks of screws. The screws are mounted in the driving portion or the portion to be driven via the coupling arrrangement, such as a permanently revolving flywheel, and in the portion which takes up the braking forces, such as the frame of the machine.

An example of the invention is illustrated in the drawings, in which:

FIG. 1 is a partial axial section through a combined coupling and braking means actuated by pressure medium and FIG. 2 is a partial side elevation of the brake side of these means.

The coupling and braking means in the present example comprises a hub 10 with a flange 11 moulded onto one side. In its outer region the flange has radial, substantially spoke-like ribs bounding apertures 12, and it forms an annularly closed abutment disc 13 for the coupling arrangement. The hub 10 has to be mounted nonrotatably on a shaft which is driven intermittently by means of the clutch arrangement. The drive element may be a permanently revolving element (not shown) such as a flywheel into which screws 14 fit, the exposed shank portions of the screws passing through sleeves 15. Distributed over the periphery of the flange 11 midway along its width are several, e.g. six, axially parallel pins 16 which are each held by a threaded pin 17.

The end o fthe hub 10 remote from the flange 11 is fixed by screws 19 to a pot-shaped cylinder 18 having a base 20 and a circular outer wall 21. The circular inner wall of the circular cylinder arrangement is formed by the outer generated surface 22 of the hub 10. At the level of the base 20 arms 23 project from the outer peripheral surface of the circular wall 21. These arms are distributed over the periphery and together support a circular abutment disc 24 which forms a member of the brake arrangement. Twelve arms 23 may, for example, be spread over the periphery of the cylinder. Heat insulating linings 25 are fitted between the arms 23 and the associated bearing surface of the disc 24. The connection is made by screws 26 passing through the linings 25. The linings 25 may be combined in a continuous ring.

In the circular cylinder bounded by the base 20, the circular wall 21 and the outer generated surface 22 of the hub 10 there is housed a circular piston 27 equipped with an external seal 28 and an internal seal 29. The piston has arms 30 projecting axially from its outer portion, and on these arms it carries a pressure disc 32 attached by screws 31 and provided with blades 33 and 34 for conveying air and with radial passages 35. The pressure disc 32 is equipped with arms 36 which project inwardly over the fastening zone and which contain holes to receive the above mentioned pins 16. Between the base portion of the piston 27 and the flange 11 there are braced helical compression springs 37 which are distributed over the periphery and preferably mounted on the flange side by pins 39 combined in a ring 38.

A friction ring 40 for the clutch side fits between the pressure disc 32 and the abutment disc 13. It is covered on both sides with friction material 41, which is riveted in position, and is mounted for axial displacement but not for rotation on the above mentioned sleeves 15. Another friction ring 42 but for the brake arrangement, also covered with friction material 41, similarly engages between the pressure disc 32 and the abutment disc 24. The ring 42 is identical with the ring 40 including its covering material. It is mounted for axial displacement but not for rotation on sleeves 43 which enclose screws 44 fitting into the body of the machine. The friction rings 40, 42 are preferably each divided into two complementary sectors.

It has already been mentioned that the pressure disc 32 has air blades 33 and 34. The external surface of the bottom 20 of the cylinder is additionally provided with air blades 45 and the external surface of the abutment disc 24 with air blades and/or surface-enlarging ribs 46. The rib webs connecting the circular portion, which forms the abutment disc 13, to the central or core region of the flange 11 are shown at 47.

A supply passage for the operating medium (not shown) is provided in the shaft and the hub 10 to establish a connection with the working chamber of the circular cylinder.

During correct use of the apparatus, when the working chamber of the cylinder is de-pressurised the pressure disc 32, which is joined to the piston 27 by screws 31, will be urged by springs 37 against the friction ring disc 42 bearing against the abutment disc 24. As the disc 24, with the aid of the cylinder 18 and pressure disc 32, is nonrotatably connected by way of the pins 16 and the flange 11 to the hub 10 and thus the shaft of the arrangement, the shaft is held in a starting position. When a pressure medium is introduced into the working chamber of the cylinder 18, the piston 27 is raised against the tension of the springs 37 loading it, and the braking action is initially suspended. On further movement of the piston against the tension of the springs 37 the pressure disc 32 is urged against the friction disc 40, which is again axially supported against the abutment disc 13, so that a nonrotary connection is established between the shaft carrying the apparatus and the unit, such as the fly wheel, into which the screws 14 fit. The shaft is accordingly entrained by the flywheel or the like. When the working chamber of the cylinder 18 is relieved the springs 37 again become active to uncouple the apparatus from the drive, then to decelerate it relatively to the housing of the machine, and finally to secure it.

The portions of the combined coupling and braking means which are subject to friction are effectively cooled, since fresh air is supplied through the apertures 12 in the flange 11 and also through the passages provided between successive arms 23 on the cylinder. The air can flow between interacting parts which are not rubbing against one another at the time and particularly through the radial passages 35 in the pressure disc 32, resulting in good elimination of heat, which allows for high switching frequencies and large operating torques. The mechanical stresses on the members forming the apparatus are favourable, since the abutment disc 13 is independently connected to the hub 10 by the flange 11 and the abutment disc 24 by the cylinder. The pins 16 for nonrotatably supporting the pressure disc 32 require only relatively short free lengths, i.e. they are also subject only to slight stresses.

An already mentioned, the construction illustrated is only an example of the invention. The invention is not restricted to it and many other embodiments and applications are possible. The combined coupling and braking means could be used differently from the manner explained above by exchanging the functions of the coupling arrangement and the brake arrangement.

We claim:

1. In combination with a machine frame, a shaft turnably mounted in said frame, and a rotating flywheel turnably mounted on said shaft, a pressure fluid operated combined clutch and brake mechanism for selectively coupling and uncoupling the flywheel to the shaft and for braking the shaft when the flywheel is uncoupled therefrom, said mechanism comprising hub means fixed to the shaft for rotation therewith and having at one end a radially extending flange forming a first abutment disk and at the other end an annular cylinder of an outer diameter smaller than that of said flange and having an open end facing said flange spaced therefrom, a base closing the open end of the cylinder, and a plurality of circumferentially spaced arms projecting radially outwardly from said base; a second annular abutment disk having an inner diameter larger than said outer diameter of said cylinder and being carried by said arms substantially coaxially with said cylinder to form an annular gap with the latter; heat insulating means sandwiched between adjacent faces of said arms and said second abutment disk; an annular piston in said annular cylinder and forming with the closed end of the latter a pressure space; an annular pressure disk arranged between said flange and said second abutment disk and being carried by said piston for movement in axial direction therewith; means connecting said pressure disk to said flange for rotation therewith and for movement in axial direction relative thereto; first friction ring means arranged between said first abutment disk and said annular pressure disk and carried by the flywheel for rotation therewith and for movement in axial direction relative thereto; second friction ring means arranged between said annular pressure disk and said second abutment disk and carried by the stationary machine frame for movement in axial direction relative thereto so that when said piston is moved in one direction, said hub will be coupled to said flywheel for rotation therewith while when the piston is moved in the opposite direction, said hub will be braked; passage means communicating with said pressure space for feeding pressure fluid thereinto for moving said piston in said one direction; and biassing means connected to said piston for normally biassing the latter in said opposite direction.

2. The combination as defined in claim 1, wherein said pressure disk is provided with cooling passages therethrough communicating with said annular gap and vanes for circulating air through said cooling passages during rotation of said pressure disk.

3. The combination as defined in claim 2, wherein said annular piston is provided with a plurality of axially extending and circumferentially spaced arms and said pressure disk is carried on the free ends of said arms on said piston, and wherein said cooling passages and vanes on said pressure disk are arranged to circulate cooling air also through the spaces between said arms.

4. The combination as defined in claim 3, wherein said flange is formed with a plurality of axially extending apertures therethrough, said apertures being bounded by radially extending ribs.

References Cited

UNITED STATES PATENTS

| | | | |
|---|---|---|---|
| 2,241,242 | 5/1941 | Friedman | 192—113.1 |
| 2,313,187 | 3/1943 | Williamson | 192—18.1 |
| 2,472,452 | 6/1949 | Wissman | 192—18.1 |
| 2,674,356 | 5/1954 | Eason | 192—18.1 |
| 3,200,917 | 8/1965 | Herr et al. | 192—18.1 |

BENJAMIN W. WYCHE III, Primary Examiner

U.S. Cl. X.R.

192—113